(12) United States Patent
Goto et al.

(10) Patent No.: US 7,709,567 B2
(45) Date of Patent: May 4, 2010

(54) OXYGEN-ABSORBING RESIN COMPOSITION

(75) Inventors: Hiroaki Goto, Yokohama (JP); Ikuo Komatsu, Yokohama (JP); Takayuki Ishihara, Yokohama (JP); Yoshihiro Ohta, Yokohama (JP); Shigenobu Murakami, Yokohama (JP); Nobuo Hirakawa, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 11/351,737

(22) Filed: Feb. 10, 2006

(65) Prior Publication Data

US 2006/0211811 A1    Sep. 21, 2006

Related U.S. Application Data

(63) Continuation of application No. PCT/JP2004/009705, filed on Jul. 1, 2004.

(30) Foreign Application Priority Data

| Jul. 10, 2003 | (JP) | ............................. 2003-194839 |
| Feb. 23, 2004 | (JP) | ............................. 2004-046696 |
| Feb. 23, 2004 | (JP) | ............................. 2004-046697 |
| Mar. 31, 2004 | (JP) | ............................. 2004-104437 |
| Apr. 6, 2004 | (JP) | ............................. 2004-112453 |
| Jun. 23, 2004 | (JP) | ............................. 2004-185097 |

(51) Int. Cl.
*C06B 23/00* (2006.01)

(52) U.S. Cl. ........................ 524/398; 524/401; 524/413; 252/188.28

(58) Field of Classification Search .................. 524/327, 524/398, 431, 440, 394, 401, 413; 252/188.28
See application file for complete search history.

(56) References Cited

U.S. PATENT DOCUMENTS 6,004,477 A * 12/1999 Nakagawa et al. ..... 252/188.28
6,599,598 B1 * 7/2003 Tai et al. ..................... 428/36.6
2002/0115768 A1   8/2002 Kikuchi et al.
2002/0146527 A1  10/2002 Kikuchi et al.

FOREIGN PATENT DOCUMENTS

| AU | 200020635 B2 | 9/2000 |
| AU | 2003262283 A1 | 3/2004 |
| CN | 1266071 A | 9/2000 |
| EP | 1061099 | 12/2000 |
| EP | 1 553 137 | 7/2005 |
| JP | 5-51494 A | 3/1993 |
| JP | 10-87921 A | 4/1998 |
| JP | 10-298306 A | 11/1998 |
| JP | 11-279344 A | 10/1999 |
| JP | 2000-143889 A | 5/2000 |
| JP | 2002-241608 A | 8/2002 |
| JP | 2003-11283 A | 1/2003 |
| JP | 2003-12944 A | 1/2003 |
| WO | WO 2004/018556 | 3/2004 |

OTHER PUBLICATIONS

Written Opinion of PCT/JP2004/009705 (English translation).
International Search Report for PCT/JP2004/009705 mailed Oct. 5, 2004.

* cited by examiner

*Primary Examiner*—Peter D Mulcahy
(74) *Attorney, Agent, or Firm*—Hoffmann & Baron, LLP

(57) ABSTRACT

The present invention herein provides an oxygen-absorbing resin composition which is excellent in the oxygen-absorbability and which can inhibit any deterioration through oxidation during the molding operations of the composition and does not accordingly undergo any coloration during the molding operations. The present invention thus provides an oxygen-absorbing resin composition characterized in that it comprises (A) a hydrogenated styrene-diene copolymer; (B) a thermoplastic resin including ethylenic structural units in its molecular structure; and (C) a transition metal catalyst, wherein the oxidation of the thermoplastic resin (B) proceeds while the copolymer (A) serves as a trigger and the composition thus absorbs oxygen. In this respect, the copolymer (A) comprises carbon-carbon double bonds derived from the diene in an amount ranging from $1\times10.5$ to $1\times10.2$ eq/g.

9 Claims, No Drawings

OXYGEN-ABSORBING RESIN COMPOSITION

CROSS-REFERENCE TO RELATED APPLICATIONS

This application is a continuation of International Application No. PCT/JP2004/009705, which designates the U.S., filed Jul. 1, 2004, which claims priority to Japanese Application No. 2003-194839, filed Jul. 10, 2003, Japanese Application No. 2004-46696, filed Feb. 23, 2004, Japanese Application No. 2004-46697, filed Feb. 23, 2004, Japanese Application No. 2004-104437, filed Mar. 31, 2004, Japanese Application No. 2004-112453, filed Apr. 6, 2004 and Japanese Application No. 2004-185097, filed Jun. 23, 2004, the contents of which are incorporated by reference herein.

BACKGROUND OF THE INVENTION

The present invention relates to an oxygen-absorbing resin composition used as a packaging material for contents quite susceptible to deterioration in the presence of oxygen, in particular, beverages, foods, pharmaceutical agents or the like.

As packaging containers, there have conventionally been used, for instance, metallic cans, glass bottles and various kinds of plastic containers. The plastic containers have such advantages that they are light-weight and excellent in the impact resistance to some extent, but they suffer from various problems such that the contents packaged therein are deteriorated due to the oxygen gas possibly passing through the walls of the containers and that they undergo the reduction of their flavor. In case of, in particular, the metallic cans and the glass bottles, the permeability to oxygen gas is almost zero and only the oxygen remaining in these containers would contribute to, for instance, the deterioration of the contents thereof, while in case of the plastic containers, an amount of oxygen which cannot be disregarded may permeate through the walls thereof and accordingly, the plastic containers suffer from a problem that the shelf stability of the contents thereof is quite low.

To solve such problems associated with these plastic containers, there has been proposed the use of multi-layer structures each having at least one layer of a resin having gas-barrier properties such as an ethylene-vinyl alcohol copolymer (see, for instance, Japanese Un-Examined Patent Publication Hei 1-278344).

In addition, there has also been proposed a composition comprising a polymer and having oxygen-trapping properties or a barrier for packaging, which comprises a layer of such a composition, wherein the composition traps oxygen through the oxidation of an oxidizable organic component with a metallic catalyst and a polyamide, in particular, a xylylene group-containing polyamide is used therein as such an oxidizable organic component (see, for instance, TOKUHYO Hei 2-500846).

In this respect, the foregoing resin excellent in the gas-barrier properties such as an ethylene-vinyl alcohol copolymer (EVOH) suffers from such a problem that it shows quite excellent oxygen-barrier properties under the low-humidity conditions, but it has an extremely high permeability to oxygen under the high humidity conditions. Furthermore, the foregoing gas-barrier resin has frequently been used in combination with the heat-sterilization/packaging technique such as the hot water-sterilization technique, the sterilization technique through boiling, and the retort-sterilization technique for the improvement of the shelf stability of the contents of the packages. Accordingly, EVOH is exposed to high-humidity conditions during the heat-sterilization process. For this reason, not only it is thus in the state having a high oxygen-permeability, but also the state thereof having a high oxygen-permeability is continuously maintained even after the completion of the sterilization treatment and therefore, it would be impossible to ensure the desired barrier properties.

DISCLOSURE OF THE INVENTION

However, the foregoing oxygen-absorbing resin composition suffers from a problem in that the composition undergoes undesirable coloration during molding operations due to the deterioration through oxidation and the resulting product is unfavorable from the viewpoint of its appearance. Moreover, there has likewise been desired for the development of an oxygen-absorbing resin composition showing further improved heat resistance.

It is an object of the present invention to provide an oxygen-absorbing resin composition corresponding to the foregoing oxygen-absorbing resin composition, which is excellent in the oxygen-absorbability and which can inhibit any deterioration through oxidation during the molding operations of the composition and does not accordingly undergo any coloration during the molding operations.

It is another object of the present invention to provide an oxygen-absorbing resin composition which is excellent in the heat resistance.

The present invention thus provides an oxygen-absorbing resin composition, which comprises (A) a hydrogenated styrene-diene copolymer; (B) a thermoplastic resin including ethylenic structural units in its molecular structure; and (C) a transition metal catalyst, wherein the oxidation of the thermoplastic resin (B) proceeds while the copolymer (A) serves as a trigger and as a result, the composition absorbs oxygen. In this respect, the copolymer (A) preferably comprises carbon-carbon double bonds derived from the diene in an amount ranging from $1\times10^{-5}$ to $1\times10^{-2}$ eq/g.

The oxygen-absorbing resin composition of the present invention is excellent in the oxygen-absorbability and the use thereof would permit the inhibition of any deterioration of the resin through oxidation during the molding operations thereof. Moreover, the present invention can likewise provide an oxygen-absorbing resin composition which is excellent in the heat resistance.

BEST MODE FOR CARRYING OUT THE PRESENT INVENTION

The oxygen-absorbing resin composition according to the present invention comprises (A) a hydrogenated styrene-diene copolymer; (B) a thermoplastic resin including ethylenic structural units in its molecular structure; and (C) a transition metal catalyst, wherein the oxidation of the thermoplastic resin (B) proceeds while the copolymer (A) serves as a trigger and as a result, the composition absorbs oxygen.

The hydrogenated styrene-diene copolymer (A) may be prepared by the hydrogenation of a styrene-diene copolymer. For instance, this component may be a resin available from Asahi Kasei Chemicals Co., Ltd. under the grade name of TUFTEC P2000. The vinyl-polybutadiene phases in the styrene-diene copolymer are hydrogenated, in this resin. An oxygen-absorbing resin composition excellent in the heat resistance can herein be provided through the use of such a hydrogenated styrene-diene copolymer (A).

The styrene-diene copolymer may preferably be those comprising repeating units derived from a linear or cyclic conjugated or non-conjugated diene. These resins may be used alone or in the form of a blend of at least two of them.

As the linear or cyclic conjugated or nonconjugated diene, there may be listed, for instance, conjugated dienes such as butadiene and isoprene; linear non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene; and cyclic non-conjugated dienes such as methyl tetrahydro-indene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and di-cyclopentadiene.

Specific examples of the copolymer (A) include, for instance, hydrogenated styrene-butadiene copolymers, and hydrogenated styrene-isoprene copolymers.

The copolymer may be in any state such as random copolymers or block copolymers. In this connection, block copolymers are preferably used herein from the viewpoint of their effect as a trigger and, in particular, more preferably used herein are hydrogenated styrene-isoprene-styrene tri-block copolymers, and hydrogenated styrene-butadiene-styrene tri-block copolymers. Regarding the chemical structures, the foregoing tri-block copolymers may be linear or radial ones and the carbon-carbon double bonds of the diene moieties in the diene block copolymers prior to the hydrogenation may be present in the main chain in the form of vinylene groups or in the side chains in the form of vinyl groups. Further, specific examples of the foregoing random copolymers include hydrogenated styrene-isoprene random copolymers, and hydrogenated styrene-butadiene random copolymers.

Other useful examples of the styrene copolymers whose sites derived from dienes are moderately hydrogenated include hydrogenated styrene-diene-olefin crystalline tri-block copolymers and, in particular, hydrogenated styrene-butadiene-olefin crystalline tri-block copolymers are preferred because of the inhibition of the formation of any oxidized by-product.

Among these, preferably used herein as the copolymers (A) are copolymers comprising the units derived from dienes whose branched portions have $C_2$ alkyl chains since they can exert significant trigger effects on the thermoplastic resins (B) and they are accompanied by the formation of only a small amount of oxidized by-products after the absorption of oxygen and specific examples thereof preferably used herein are hydrogenated styrene-butadiene copolymers and, in particular, hydrogenated styrene-butadiene-styrene tri-block copolymers.

Moreover, the copolymer (A) preferably has a content of diene-derived carbon-carbon double bonds ranging from $1\times10^{-5}$ to $1\times10^{-2}$ eq/g. More preferably, the content of the double bonds ranges from $1\times10^{-4}$ to $1\times10^{-2}$ eq/g. Further preferably, the content of the double bonds ranges from $1\times10^{-4}$ to $5\times10^{-3}$ eq/g. Accordingly, the oxygen-absorbing resin composition as a blend comprising the foregoing components (A), (B) and (C) preferably has a content of carbon-carbon double bonds ranging from $2\times10^{-6}$ to $1\times10^{-4}$ eq/g. More preferably, the content of the double bonds ranges from $1\times10^{-5}$ to $5\times10^{-5}$ eq/g.

As the foregoing resins (B), there may be listed, for instance, polyethylenes such as low-density polyethylene, medium-density polyethylene, high-density polyethylene, linear low-density polyethylene and very linear low-density polyethylene; polypropylenes such as isotactic or syndiotactic polypropylenes; ethylene moiety-containing copolymers such as ethylene-propylene copolymers, polybutene-1, ethylene-butene-1 copolymers, ethylene-propylene-butene-1 copolymers, ethylene-vinyl acetate copolymers, and ethylene-vinyl alcohol copolymers; propylene moiety-containing copolymers such as propylene-butene-1 copolymers; ionic crosslinked olefinic copolymers; or blends thereof The resin (B) preferably used herein are polyethylene, polypropylene, ethylene-propylene copolymers, ethylene moiety-containing copolymers and propylene moiety-containing copolymers.

In addition, usable herein as the thermoplastic resins (B) having ethylenic structural units in its molecular structure also include acid-modified olefinic resins obtained by modifying, through grafting, the foregoing resins as base polymers with unsaturated carboxylic acids or derivatives thereof.

Moreover, the foregoing resin (B) is preferably a resin obtained by the polymerization of C2 to C20 monomers and is substantially free of any ethylenically unsaturated bond. Furthermore, the foregoing resin (B) is preferably a linear low density polyethylene whose side chain consists of a linear hydrocarbon in the amount of not more than 0.003 eq/g, or a resin comprising an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon. In the foregoing linear low density polyethylene having such a side chain in the amount of not more than 0.003 eq/g, the amount (eq/g) of the side chain consisting of a linear hydrocarbon in the polyethylene means a value obtained by determining the number of side chains present in 2 g of the resin and then dividing the resulting number of side chains by the Avogadro's number and if representing the Avogadro's number and the number of side chains present in 1 g of the resin N and n, respectively, this value can be calculated according to the relation: n/N (those in the following description are shown in the same way also). In this connection, the phrase "substantially free of any ethylenically unsaturated bond" used herein means that the resin is preferably completely free of any ethylenically unsaturated bond, but it may comprise such ethylenically unsaturated bonds in an amount of up to about 0.0001 eq/g.

Regarding the linear low density polyethylene used in the aforementioned oxygen-absorbing resin composition of the present invention, a comonomer capable of forming linear side chains is selected and the comonomer thus selected is then copolymerized with ethylene to thus form a desired low density polyethylene whose a side chain consists of linear hydrocarbons in the amount of not more than 0.003 eq/g.

The resin whose side chain consists of a linear hydrocarbon would be completely free of any molecular cleavage frequently observed at the branched site of a resin unlike the resins having side chains carrying branches and this would in turn inhibit the generation of any low molecular weight volatile component. Moreover, tertiary carbon-carrying sites quite susceptible to oxidation are intentionally introduced into the molecular chain of a resin to control the progress of the oxidation and to thus prevent the occurrence of any random molecular breakage accompanied by the oxidation of secondary carbon-carrying sites or the like.

The foregoing polymerization which is carried out through the use of a single-site catalyst would be able to prevent the compositional ratio for copolymerization from varying throughout the entire molecular weight components. As a result, the resulting copolymer has a uniform molecular structure and accordingly, the molecular chains constituting the copolymer are uniformly oxidized, any excess progress of a side reaction is inhibited and the formation of any by-product through the oxidation due to undesirable molecular breakage can thus certainly be inhibited.

Such a catalyst preferably used herein may be, for instance, metallocene type ones. Examples of other catalysts usable herein are those used for the polymerization of olefins, which are recognized to be post-metallocene catalysts and, in particular, preferred examples of the latter are phenoxy imine catalysts (FI Catalyst).

On the other hand, when the foregoing monomers are polymerized using a catalyst other than the single site catalyst, for instance, a multi-site catalyst such as a Ziegler-Natta catalyst, it is quite difficult for every molecular chains to make the copolymerization ratio of ethylene to comonomers uniform and accordingly, there are observed undesirable conditions such that the oxidation locally takes place at particular sites.

In addition, if the content of the side chains branched off from the main chain exceeds 0.003 eq/g, the main chain of the resin has an increased rate of tertiary carbon atoms which correspond to the side chain-bonding points and which are preferentially susceptible to oxidation, this results in an increase of the frequency of the formation of small molecules due to the breakage of the main chain and as a result, this further become a cause of the formation of low molecular weight components in a large amount. This, in turn, adversely affects the flavor and taste of the contents to be packaged in the resulting resin.

The content of the side chains preferably ranges from 0.0003 to 0.003 eq/g, in particular, 0.0005 to 0.003 eq/g. The use of such a resin is preferred since if the content thereof falls within the range specified above, not only the amount of by-products formed through the oxidation of the resulting resin can be reduced, but also the resulting resin surely has stable oxygen-absorbability and good stability to heat.

The aforementioned linear low density polyethylene may preferably be, for instance, copolymers of ethylene and α-olefin prepared using a metallocene catalyst such as copolymers of ethylene and 1-butene, copolymers of ethylene and 1-hexene and copolymers of ethylene and 1-octene. These resins may be used alone or in any combination of at least two of them.

The preparation of the foregoing resin through the polymerization using a single-site catalyst may be carried out using any industrially acceptable method, but it is preferably carried out according to the liquid phase technique since this technique has most widely been employed in this field.

On the other hand, the oxygen-absorbing resin composition of the present invention may comprise a resin comprising an aliphatic side chain in the total amount of not more than 0.005 eq/g and in which resin the aliphatic side chain consists of a cyclic hydrocarbon, a part of the ring structure of which is shared with that of the main chain, or a resin in which an aliphatic side chain consists of the foregoing cyclic hydrocarbon and a linear hydrocarbon and this resin can be prepared by the copolymerization of ethylene and an alicyclic hydrocarbon carrying an ethylenically unsaturated bond, or the copolymerization of ethylene, an alicyclic hydrocarbon carrying an ethylenically unsaturated bond, and a comonomer capable of forming a linear side chain.

This resin comprises, in the main chain, cyclic hydrocarbons in which a part of the ring structure thereof is in common with the main chain. Accordingly, any decomposition at the cyclic portion thereof never takes place unless two portions of a tertiary carbon present in the main chain are simultaneously cleaved and the resin is thus less susceptible to the formation of by-products through oxidation in comparison with the quantity of absorbed oxygen observed for the resin.

Moreover, if a side chain represented by the following chemical formula 1 is formed, any low molecular weight component is not generated even when a tertiary carbon atom present in the side chain is oxidized, as shown in the following Scheme I:

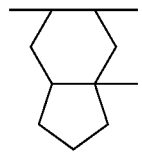

Chemical Formula 1

Scheme I

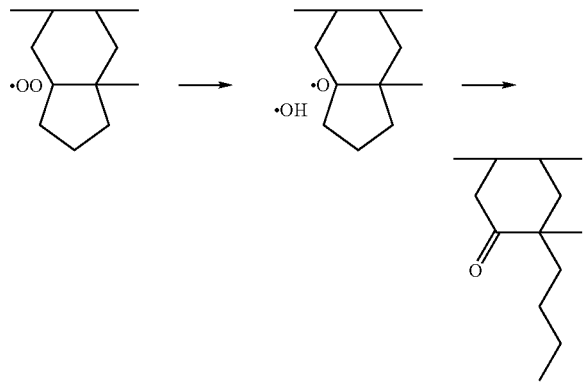

These resins each carrying aliphatic cyclic side chains have such a tendency that they have higher glass transition temperatures. However, if a resin has a high glass transition point, the molecular chains present in the resin have insufficient mobility at ordinary temperature and the resin is thus liable to have a reduced oxygen-absorbing rate. In this respect, the glass transition point of a resin can appropriately be reduced by the incorporation of side chains derived from linear hydrocarbons through the copolymerization with a proper amount of ethylene or the copolymerization with a linear comonomer other than ethylene. In this case, the side chains derived from linear hydrocarbons are preferably those having not less than 4 carbon atoms. Preferred glass transition point of the resin is not higher than 50° C.

In the resin component (B), which comprise an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon, the resin may be one prepared by block copolymerization, random copolymerization or alternating copolymerization of monomers each carrying a cyclic side chain, but the aliphatic cyclic side chain portions of the resin are liable to have reduced mobility and accordingly, the resin is preferably prepared by the random copolymerization or the alternating copolymerization of the foregoing monomers.

In this connection, if the content of the total aliphatic side chains linked to the main chain exceeds 0.005 eq/g, the resulting resin has an extremely high density of the tertiary carbon atoms present in the main chain thereof and this in turn leads to an increase in the frequency of the formation of low molecular weight molecules due to the cleavage of the main chain. Consequently, this becomes a cause of the formation of a large amount of low molecular weight components and, in turn, adversely affects the flavor of the contents to be packaged in the resulting resin.

The content of the aliphatic side chains preferably ranges from 0.0005 to 0.005 eq/g, in particular, 0.001 to 0.005 eq/g. The use of such a resin is preferred since if the content thereof falls within the range specified above, not only the amount of by-products formed through the oxidation of the resulting resin can be reduced, but also the resulting resin surely has stable oxygen-absorbability and good stability to heat.

The resin consisting of moieties derived from a cyclic hydrocarbon in which a part of the ring structure is in common with the main chain thereof or the resin in which an aliphatic side chain consists of the foregoing cyclic hydrocarbon and a linear hydrocarbon is preferably prepared by the polymerization carried out using a single-site catalyst since this polymerization technique would permit the preparation of a variety of copolymers and the control of the microstructures of the resulting copolymers. Such a single-site catalyst preferably used herein may be, for instance, the aforementioned metallocene type ones and those used for the polymerization of olefins, which are recognized to be post-metallocene catalysts. Specific examples thereof include, but not limited to, catalysts each comprising Ti or Zr as a central metal and two indenyl groups, or the combination of a cyclopentadienyl group and a benzo-indenyl group, as the ligands thereof Preferably used herein further include, for instance, phenoxy titanium type catalysts comprising combinations of cyclopentadienyl type ligands with phenoxy type ligands. Specific examples of the resins carrying cyclic side chains prepared using such single-site catalysts are cyclic olefin copolymers (APEL: available from Mitsui Chemicals, Inc.).

The resin which a part of the ring structure of the cyclic hydrocarbon is shared with the main chain, or whose side chain consists of said cyclic hydrocarbon and said linear hydrocarbon can be prepared by the copolymerization of, for instance, ethylene and cyclobutene; ethylene and cyclopentene; ethylene and cyclohexene; or ethylene and cyclooctene using, for instance, a metallocene type single-site catalyst comprising Zr as a central metal. Moreover, linear aliphatic side chains may be incorporated into the resulting resin by the use of a comonomer such as 1-butene, 1-hexene and/or 1-octene in addition to the foregoing 2-component system. Further, the structure of the resulting copolymer such as block and random copolymer structures can be obtained by appropriately selecting the kind of catalyst used, as has been discussed above.

The resins whose number of side chains falls within the range specified above according to the present invention can be prepared by controlling the compositional ratio of the foregoing copolymers.

A part of the hydrogen atoms constituting the cyclic hydrocarbon may be substituted with other atoms or atomic groups. Examples of such atomic groups are alkyl groups, those derived from aldehydes, carboxyl groups and hydroxyl group. In case of, for instance, cyclohexene, easily available as reagents are monomers such as 3-cyclohexene-1-carboxyaldehyde, 3-cyclohexene-1-carboxylic acid and 3-cyclohexene-1-methanol. The frequency of such substitution of a hydrogen atom with an atomic group is preferably not more than 1, per side chain consisting of a cyclic hydrocarbon.

If the substituent atomic group is a polar one, the kind of the central metal and/or the ligand of a catalyst to be used may appropriately be selected depending on, for instance, the bulkiness of the hydrocarbon molecule substituted with the atomic group and the degree of the polarity of the molecule. As the catalyst used for the copolymerization of ethylene and methyl methacrylate as a polar monomer, there have been known metallocene type ones each comprising Sm as the central metal and two cyclopentadienyl groups as the ligands.

The resin may likewise comprise, therein, an aromatic side chain other than the aliphatic one such as a phenyl group. In this case, however, the moieties carrying such aromatic groups are preferably present in the resin, in the form of, for instance, styrene blocks.

Furthermore, it is also possible to use a blend of the foregoing linear low density polyethylene whose a side chain consists of linear hydrocarbons in the amount of not more than 0.003 eq/g and a resin comprising an aliphatic side chain in the total amount of not more than 0.005 eq/g and in which resin the aliphatic side chain consists of a cyclic hydrocarbon, a part of the ring structure of which is shared with that of the main chain, or in which resin the aliphatic side chain consists of the foregoing cyclic hydrocarbon and a linear hydrocarbon.

In the oxygen-absorbing resin composition according to the present invention, the copolymer component (A) is preferably present in the resin composition in such a manner that it is dispersed in the matrix of the resin (B). The copolymer (A) is preferably dispersed in the matrix in the form of fine particles having an average particle size of not more than 10 μm and it is particularly preferably dispersed in the matrix in the form of fine particles having an average particle size of not more than 5 μm. The resin (B) per se serves as an oxygen-absorbing agent due to the trigger action of the copolymer (A) uniformly dispersed in the matrix of the resin (B). For this reason, the resin composition of the present invention can efficiently absorb oxygen over a long period of time as compared with the conventional oxygen scavenger. In this respect, the amount of the copolymer (A) to be incorporated into the resin composition is small, but sufficient for showing the desired trigger effect and therefore, the incorporation thereof into the resin composition never deteriorates the molding properties of the matrix resin (B). Moreover, the present invention is likewise advantageous in cost since the present invention would permit the use of the general-purpose resin in the absorption of oxygen.

The resin (B) is preferably incorporated into the resin composition of the present invention in a high rate so that it can form a matrix and that it can absorb a large quantity of oxygen through the oxidation thereof and therefore, the content thereof in the resin composition more preferably ranges from 90 to 99% by mass and further preferably 92.5 to 97.5% by mass. In addition, the copolymer (A) is preferably incorporated into the resin composition in a low rate so that the copolymer can be present in such a condition that it is dispersed in the matrix of the resin (B) and that it can serve as a trigger for the oxidation of the resin (B) and accordingly, if taking into consideration the molding properties of the resulting resin composition observed when molding the same into a film, a sheet or a cup, a tray, a bottle, a cube or a cap, the content of the copolymer (A) in the composition preferably ranges from 1 to 10.0% by mass and more preferably 2.5 to 7.5% by mass.

Preferably used herein as transition metal catalysts are, for instance, metal components belonging to the Group VIII of Periodic Table such as iron, cobalt and nickel, but examples thereof also include metals of Group I such as copper and silver; metals of Group IV such as tin, titanium and zirconium; metals of Group V such as vanadium; metals of Group VI such as chromium; and metals of Group VII such as manganese. Among these metallic components, the cobalt component is particularly suitable for the intended purpose of the present invention because of its high oxygen-absorbing rate.

The foregoing transition metal catalyst is in general used in the form of a salt or a complex thereof with an inorganic or organic acid having a low valence.

Examples of inorganic acid salts thereof are halides such as chlorides; salts with sulfur atom-containing oxy-acids such as sulfates; salts with nitrogen atom-containing oxy-acids such as nitrates; salts with phosphorus atom-containing oxy-acids such as phosphates; and silicates.

On the other hand, examples of organic acids are carboxylic acids, sulfonic acids and phosphonic acids, but carboxylic acids are suitable for the intended purpose of the present invention among others and specific examples of the foregoing salts with carboxylic acids include those of the transition metals with carboxylic acids such as acetic acid, propionic acid, iso-propionic acid, butanoic acid, iso-butanoic acid, pentanoic acid, iso-pentanoic acid, hexanoic acid, heptanoic acid, iso-heptanoic acid, octanoic acid, 2-ethyl hexanoic acid, nonanoic acid, 3,5,5-trimethyl hexanoic acid, decanoic acid, neo-decanoic acid, undecanoic acid, lauric acid, myristic acid, palmitic acid, margaric acid, stearic acid, arachic acid, linderic acid, thujic acid, petroselinic acid, oleic acid, linoleic acid, linolenic acid, arachidonic acid, formic acid, oxalic acid, sulfamic acid and naphthenic acid.

On the other hand, the complexes of transition metals usable herein may be those with β-diketones or esters of β-keto-acids and examples of such β-diketones or esters of β-keto-acids usable herein are acetyl acetone, ethyl acetoacetate, 1,3-cyclohexadione, methylene-bis-1,3-cyclohexadione, 2-benzyl-1,3-cyclohexadione, acetyl tetralone, palmitoyl tetralone, stearoyl tetralone, benzoyl tetralone, 2-acetyl cyclohexanone, 2-benzoyl cyclohexanone, 2-acetyl-1,3-cyclohexanedione, benzoyl-p-chlorobenzoyl methane, bis(4-methylbenzoyl) methane, bis(2-hydroxybenzoyl) methane, benzoyl acetone, tri-benzoyl methane, di-acetyl benzoyl methane, stearoyl benzoyl methane, palmitoyl benzoyl methane, lauroyl benzoyl methane, di-benzoyl methane, bis(4-chlorobenzoyl) methane, bis(methylene-3,4-dioxybenzoyl) methane, benzoyl acetyl phenyl methane, stearoyl (4-methoxybenzoyl) methane, butanoyl acetone, di-stearoyl methane, acetyl acetone, stearoyl acetone, bis(cyclo-hexanoyl)-methane, and di-pivaloyl methane.

In case of the oxygen-absorbing resin composition comprising a copolymer (A) incorporated into the resin having gas-barrier properties such as EVOH, the amount of oxygen absorbed by the composition is determined by the number of unsaturated bonds present in the copolymer (A), in other words, the added amount of the copolymer (A). In this respect, the higher the content of the copolymer (A), the greater the amount of absorbed oxygen, but problems arise such that the oxygen-barrier properties of the basic resin are impaired and that the transparency of the resin is likewise reduced. For this reason, the copolymer (A) can be added to the composition in a limited amount and therefore, there is a limit in the amount of absorbed oxygen as well.

On the other hand, the oxygen-absorbing resin composition of the present invention can absorb oxygen according to such a mechanism that the oxidation of the resin (B) proceeds while the copolymer (A) serves as a trigger of the oxidation and therefore, the resin composition can absorb a considerably large amount of oxygen as compared with the oxygen-absorbing resin composition whose basic resin is one having gas-barrier properties such as EVOH. In addition, the resin composition of the invention is likewise advantageous in cost since the resin composition can efficiently absorb oxygen over a long period of time and it would permit the use of the general-purpose resin in the absorption of oxygen.

In the oxygen-absorbing resin composition of the present invention, the transition metal catalyst is preferably included therein in an amount ranging from 10 to 1000 ppm and in particular, 50 to 500 ppm as expressed in terms of the amount of the transition metal on the basis of the total mass of the oxygen-absorbing resin composition. If the amount of the transition metal catalyst falls within the range specified above, the resulting resin composition surely has good gas-barrier properties and likewise has excellent resistance to any deterioration during the kneading and molding operations of the same.

In addition, the oxygen-absorbing resin composition of the present invention preferably comprises a phosphorus atom-containing antioxidant in an amount of not more than 2000 ppm. The addition of such a phosphorus atom-containing antioxidant permits the improvement of the resistance to deterioration through oxidation during the molding operations of the oxygen-absorbing resin composition while maintaining higher oxygen-absorbing characteristics thereof. More preferably, the oxygen-absorbing resin composition of the present invention contains a phosphorus atom-containing antioxidant in an amount ranging from 300 to 1500 ppm.

The preparation of the oxygen-absorbing resin composition through blending may be carried out using a variety of means, but preferably used herein is one which makes use of a twin-screw extruder provided with a side feed means. The kneading of the ingredients for the oxygen-absorbing resin composition in a twin-screw extruder is preferably carried out in a non-oxidizing atmosphere in order to minimize any possible deterioration of the resin composition. Moreover, it is quite important to shorten the residence time and to reduce the molding temperature to a level as low as possible and this in turn results in the maintenance of the desired quality of the resulting oxygen-absorbing resin composition.

The oxygen-absorbing resin composition used in the present invention, if desired, comprises an activator known per se, but the addition thereof is not always necessary. Examples of such activators appropriately used herein include, but not limited to, hydroxyl group and/or carboxyl group-containing polymers such as polyethylene glycol, polypropylene glycol, ethylene-methacrylic acid copolymers, and various kinds of ionomers.

The oxygen-absorbing resin composition used in the present invention may likewise comprise a filler, a coloring agent, a heat stabilizer, a weathering agent, an antioxidant other than the phosphorus atom-containing ones, an age resister, a light stabilizer, a UV absorber, an antistatic agent, a lubricating agent such as a metal soap or a wax, and/or a known resin compound such as a modifier resin or rubber according to the formulations known per se.

For instance, the incorporation of a lubricating agent into the resin composition permits the improvement of the bite of a screw into the resin. Examples of such lubricating agents currently used are metal soaps such as magnesium stearate and calcium stearate; liquid, natural or synthetic paraffin; hydrocarbon type ones such as microwaxes, polyethylene waxes and chlorinated polyethylene waxes; fatty acid type ones such as stearic acid and lauric acid; fatty acid monoamide or bisamide type ones such as stearic acid amide, palmitic acid amide, oleic acid amide, esilic acid amide, methylene bis-stearamide, and ethylene bis-stearamide; ester type ones such as butyl stearate, hardened castor oil, and ethylene glycol monostearate; alcohol type ones such as cetyl alcohol and stearyl alcohol; and mixtures thereof.

The oxygen-absorbing resin composition of the present invention can be used for the absorption of oxygen within a sealed packages, in a variety of forms such as powder, granules or a sheet. Moreover, the resin composition is incorporated into resin or rubber used for preparing a liner, a gasket or a coated film and used for absorbing oxygen in such a form as a liner, a gasket or a coated film. In addition, the resin composition may be formed into, for instance, a film or a sheet and then used as a packaging material, or may be used in the preparation of packages in the form of a cap for packaging containers such as a cup, a tray, a bottle and a tubular container.

The oxygen-absorbing resin composition of the present invention is preferably used in the form of a multi-layered structure which comprises at least one layer containing the resin composition (hereunder referred to as "oxygen-absorbing layer") and a layer of a resin other than the foregoing resin composition. In this respect, the term "layer containing the (oxygen-absorbing) resin composition" used herein means both of a layer comprising the foregoing oxygen-absorbing resin composition alone and a layer comprising the oxygen-absorbing resin composition which is incorporated into another resin which differs from the oxygen-absorbing resin composition and is a base material.

The resin layer other than the oxygen-absorbing layer which constitutes the multi-layered structure can appropriately be selected from thermoplastic resins or thermosetting resins while taking into consideration the modes of applications thereof and/or required functions. Examples thereof include olefinic resins, thermoplastic polyester resins and resins having oxygen-barrier properties (hereunder referred to as "oxygen-barrier resins").

The foregoing olefinic resins may be, for instance, polyethylenes (PE) such as low-density polyethylene (LDPE), medium-density polyethylene (MDPE), high-density polyethylene (HDPE), linear low-density polyethylene (LLDPE), linear ultra low-density polyethylene (LVLDPE), polypropylenes (PP), ethylene-propylene copolymers, polybutene-1, ethylene-butene-1 copolymers, propylene-butene-1 copolymers, ethylene-propylene-butene-1 copolymers, ethylene-vinyl acetate copolymers, and ionic crosslinked olefinic copolymers (ionomers) or blends thereof.

In addition, examples of thermoplastic polyester resins usable herein include polyethylene terephthalate (PET), polybutylene terephthalate (PBT), polyethylene naphthalate (PEN), polyester resins mainly comprising polyglycolic acids or copolymerized polyesters thereof, or blends thereof.

The oxygen-barrier resins may be, for instance, ethylene-vinyl alcohol copolymers (EVOH). For instance, a saponified copolymer may be used, which can be prepared by saponifying an ethylene-vinyl alcohol copolymer which has an ethylene content ranging from 20 to 60 mole % and preferably 25 to 50 mole % to a degree of saponification on the order of not less than 96 mole % and preferably not less than 99 mole %.

This saponified ethylene-vinyl alcohol copolymer has a molecular weight which permits the formation of a film thereof. The saponified product in general has a viscosity of not less than 0.01 dl/g and preferably 0.05 dl/g, as determined at 30° C. using a solution in an 85:15 (ratio by weight) mixed solvent comprising phenol and water.

Examples of other oxygen-barrier resins are polyamide resins such as poly(m-xylidene adipamide) (MXD6) and polyester resins such as polyglycolic acids.

The construction of the foregoing multi-layered structure may appropriately be selected, while taking into consideration the modes of applications thereof and/or the required functions. The following are examples of such a multi-layered structure, provided that the oxygen-absorbing layer is represented by the symbol: OAR.

Two Layer Structure: PET/OAR; PE/OAR; OPP/OAR

Three Layer Structure: PE/OAR/PET; PET/OAR/PET; PE/OAR/OPP; EVOH/OAR/PET; PE/OAR/COC Four Layer Structure: PE/PET/OAR/PET; PE/OAR/EVOH/PET; PET/OAR/EVOH/PET, PE/OAR/EVOH/COC; PE/OAR/EVOH/PE Five Layer Structure: PET/OAR/PET/OAR/PET; PE/PET/OAR/EVOH/PET; PET/OAR/EVOH/COC/PET; PET/OAR/PET/COC/PET; PE/OAR/EVOH/COC/PET; PE/EVOH/OAR/EVOH/PE; PE/EVOH/OAR/COC/PE; PP/EVOH/OAR/EVOH/PP Six Layer Structure: PET/OAR/PET/OAR/EVOH/PET; PE/PET/OAR/COC/EVOH/PET, PET/OAR/EVOH/PET/COC/PET, PE/EVOH/OAR/PE/EVOH/PE; PE/EVOH/OAR/REG/EVOH/PE; PP/EVOH/OAR/PP/EVOH/PP; PE/EVOH/OAR/REG/EVOH/PP; PP/EVOH/OAR/REG/EVOH/PP; PE/EVOH/OAR/EVOH/COC/PE Seven Layer Structure: PET/OAR/COC/PET/EVOH/OAR/PET, PE/REG/EVOH/OAR/EVOH/COC/PE; PE/EVOH/OAR/REG/EVOH/COC/PE; PP/EVOH/OAR/REG/EVOH/COC/PP.

In this connection, PE represents low-density polyethylene (LDPE), medium-density polyethylene (MDPE), high-density polyethylene (HDPE), linear low-density polyethylene (LLDPE), very linear low-density polyethylene (LVLDPE).

In these structures, those having at least one oxygen-barrier layer are preferred since the presence of such an oxygen-barrier layer would allow the improvement of the lifetime of the oxygen-absorbing layer.

When preparing the foregoing laminated body, an adhesive resin layer may, if necessary, be arranged between each pair of the neighboring two layers.

Such an adhesive resin may be, for instance, a thermoplastic resin containing, in the main chain or on side chains, carbonyl groups (—CO—) originated from carboxylic acids, carboxylic acid anhydrides, carboxylic acid salts, and/or carboxylic acid esters in an amount ranging from 1 to 700 milli-equivalent (meq)/100 g resin, in particular, 10 to 500 meq/100 g resin. Examples of adhesive resins suitably used herein are at least one member selected from the group consisting of ethylene-acrylic acid copolymers, ionic crosslinked olefin copolymers, maleic anhydride-grafted polyethylenes, maleic anhydride-grafted polypropylenes, acrylic acid-grafted polypropylenes, ethylene-vinyl acetate copolymers, copolymerized polyesters, and copolymerized thermoplastic resins. These resins are useful in the lamination by, for instance, the co-extrusion technique or the sandwich-lamination technique.

The multi-layered structure can be produced according to the method known per se. For instance, the structure may be prepared according to the usual extrusion molding, while using a number of extruders corresponding to the kinds of resins to be used and a multiple die for multilayer.

Alternatively, the multi-layered structure can likewise be produced according to the co-injection molding technique or the successive injection molding technique, while using a number of injection molding machines corresponding to the kinds of resins to be used to thus form a multi-layered, injection molded body.

Moreover, a film or sheet having a multi-layered structure according to the present invention can be prepared according to the extrusion coating technique or the sandwich-lamination technique. Alternatively, a multi-layered film or sheet can likewise be produced according to the dry-lamination of preliminarily prepared films.

The packaging materials such as films can be used in the form of a bag for packaging having a variety of shapes, such a bag may be produced according to the bag-making method known per se and examples of such bags include, but not limited to, three side-sealed or four side-sealed pouches, gusseted pouches, standing pouches and pillow type packaging bags.

The packaging containers prepared from the multi-layered structure according to the present invention are useful as containers which can protect the contents thereof from losing the flavor and taste of the same due to the oxidation.

Examples of substances which can be packed in the containers are those quite susceptible to deterioration in the presence of oxygen, for instance, beverages such as beer, wine, fruit juice, carbonated soft drinks, oolong tea, and green tea; foods such as fruits, nuts, vegetables, meat products, infant foods, coffee, jam, mayonnaise, ketchup, edible oils, dressings, sauces, foods boiled down in soy, and dairy products; and others such as medicines, cosmetic products, gasoline.

The foregoing packaging containers may further be packed in a wrapping body to thus complete the packaging.

The present invention will now be described in more detail with reference to the following Examples and Comparative Examples.

EXAMPLES

Evaluation 1

The following are the method used for determining the content of carbon-carbon double bonds present in the styrene-diene copolymer used in the following Examples as well as the method for the preparation of pellets of each resin composition.

1. Method for Determining the Content of Carbon-Carbon Double Bonds Present in the Styrene-Diene Copolymer A styrene-diene copolymer was dissolved in deutero chloroform as a solvent to a concentration ranging from 10 to 15% by mass, the resulting solution was then used in the 13C-NMR (JNM-EX270 available from JEOL) measurement and the structure of the resin was identified on the basis of the resulting NMR spectra. The foregoing content was then calculated from the results as the molar number of double bonds included in one gram of the resin (eq/g).

2. Method for Preparing Pellets of Resin Composition

To a low-density polyethylene resin (JB221R available from Nippon Polyolefin Co., Ltd.), there were added a hydrogenated styrene-butadiene copolymer resin or a hydrogenated styrene-isoprene copolymer resin in various concentrations (% by mass) and cobalt neodecanoate (DICNATE5000 available from Dainippon Ink and Chemicals, Inc.), as an oxidation catalyst, in an amount of 350 ppm as expressed in Co, followed by pre-kneading of these components at 50° C. in a stirring-dryer (available from Dalton Co., Ltd.) and the subsequent introduction thereof (pre-mix) into a hopper. The pre-mix was introduced into a twin screw extruder (TEM35 available from Toshiba Machine Co., Ltd.) through a dispensing feeder, extruded into a strand-like extrudate at a set temperature of 200° C. and a number of revolutions of 100 RPM to thus give pellets of the resin composition.

3. Method for Determining Amount of Oxygen Absorbed by Resin Composition

Pellets of various kinds of resin compositions were pulverized in a freeze-pulverizing machine, followed by the dispensing of the pulverized compositions, the introduction of the pulverized and dispensed resin compositions in an oxygen-impermeable container having an inner volume of 85 ml [High-Retoflex: HR78-84, a cup-like laminated container of polypropylene/steel foil/polypropylene available from Toyo Seikan Kaisha, Ltd.] together with 1.0 ml of distilled water, the heat sealing of the container using a polypropylene inner layer)/aluminum foil/polyester (outer layer) capping material and the subsequent storage under a temperature condition of 50° C. The oxygen concentration within the container was determined with the elapse of time using the gas chromatography technique (GC-8A available from Shimadzu Corporation) to thus calculate the amount of absorbed oxygen (cc/g).

4. Method for Preparing Multi-layered Bottle and Evaluation of Oxygen-Barrier Properties Thereof There were supplied JB221R (available from Nippon Polyolefin Co., Ltd.) to a 50 mm main extruder for outer and inner polyethylene layers; MODIC L522 (available from Mitsubishi Chemical Co., Ltd.) to a 30 mm auxiliary extruder A for an adhesive layer; EVAL F101B (available from Kuraray Co., Ltd.) to a 30 mm auxiliary extruder B for a barrier layer; and each of various kinds of resin compositions formed into pellets to a 30 mm auxiliary extruder C for an oxygen-absorbing layer to thus extrude a molten parison through a multi-layered die maintained at 210° C., followed by molding it into a multi-layered cylindrical bottle comprising 6 layers of 5 components and having a mass of 12 g and an inner volume of 150 ml, according to the known melt-blow molding technique at a nozzle diameter: $\phi$ of 45. The layer structure thereof was as follows:

Outer PE Layer/Adhesive Layer/Barrier Layer/Adhesive Layer/Oxygen-Absorbing Layer/PE Layer Mass Ratio: 20/2.5/5/2.5/10/60 (% by mass)

The oxygen-barrier properties of the resulting multi-layered bottle were evaluated by introducing 1 ml of distilled water in this container, the opening thereof was tightly sealed with an aluminum-laminating material under the nitrogen gas atmosphere, the initial oxygen concentration within the container was reduced to a level of not more than 0.02% and the system was stored at 30° C., 80% RH. The oxygen concentration within the container was determined with the elapse of time using the gas chromatography technique (GC-8A available from Shimadzu Corporation).

5. Method for the Determination of Hunter's Color b Value

A specimen having a size of 40 mm×40 mm was cut out from the trunk wall of the foregoing multi-layered bottle and the Hunter's color b value was determined according to the reflection method using a color computer (SM-4 available from SUGA. Test Machine Co., Ltd.) while placing a standard white plate on the back side of the specimen.

Example 1

There were incorporated, into a low-density polyethylene resin (JB221R available from Nippon Polyolefin Co., Ltd.), 5.0% by mass of a hydrogenated styrene-isoprene-styrene tri-block copolymer resin (HYBLER 7125 available from Kuraray Corporation; the content of carbon-carbon double bonds present in this resin was found to be $2.0 \times 10^{-4}$ eq/g) and an oxidation catalyst, followed by the preparation of pellets of the resin composition according to the method described above and the subsequent calculation of the amount of oxygen absorbed by the resin composition (cc/g). The results thus obtained are summarized in the following Table 1.

In addition, a multi-layered bottle was prepared from the pellets according to the method described above and the oxygen-barrier properties thereof were evaluated and the Hunter's color b value was likewise determined. The results thus obtained are summarized in the following Table 2.

Example 2

The same procedures used in Example 1 were repeated except for using a hydrogenated styrene-butadiene-styrene tri-block copolymer resin (TUFTEC P2000 available from Asahi Kasei Chemicals Co., Ltd.; the content of carbon-carbon double bonds present in this resin was found to be $1.9 \times 10^{-3}$ eq/g) in place of the hydrogenated styrene-isoprene-styrene tri-block copolymer resin to thus form pellets of the resulting resin composition and to calculate the amount of oxygen absorbed by the resin composition (cc/g). The results thus obtained are summarized in the following Table 1.

In addition, a multi-layered bottle was prepared from the pellets according to the method described above and the oxygen-barrier properties thereof were evaluated and the Hunter's color b value was likewise determined. The results thus obtained are summarized in the following Table 2.

Example 3

The same procedures used in Example 1 were repeated except for using 2.5% by mass of a hydrogenated styrene-butadiene-styrene tri-block copolymer resin (TUFTEC P2000 available from Asahi Kasei Chemicals Co., Ltd.; the content of carbon-carbon double bonds present in this resin was found to be $1.9 \times 10^{-3}$ eq/g) and 2.5% by mass of a hydrogenated styrene-butadiene copolymer resin (DYNARON 1320P available from JSR Co., Ltd.; the content of carbon-carbon double bonds present in this resin was found to be $2.4 \times 10^{-5}$ eq/g) in place of the hydrogenated styrene-isoprene-styrene tri-block copolymer resin to thus form pellets of the resulting resin composition and to calculate the amount of oxygen absorbed by the resin composition (cc/g). The results thus obtained are summarized in the following Table 1.

In addition, a multi-layered bottle was prepared from the pellets according to the method described above and the oxygen-barrier properties thereof were evaluated and the Hunter's color b value was likewise determined. The results thus obtained are summarized in the following Table 2.

Example 4

There were incorporated, into a low-density polyethylene resin (JB221R available from Nippon Polyolefin Co., Ltd.), 5.0% by mass of a hydrogenated styrene-isoprene-styrene tri-block copolymer resin (HYBLER 7125 available from Kuraray Corporation; the content of carbon-carbon double bonds present in this resin was found to be $2.0 \times 10^{-4}$ eq/g), an oxidation catalyst and further 1000 ppm of a phosphorus atom-containing antioxidant (ADEKA STAB 2112 available from Asahi Denka Kogyo K.K.), followed by repeating the same procedures used in Example 1 to thus prepare pellets of the resin composition and the subsequent calculation of the amount of oxygen absorbed by the resin composition (cc/g). The results thus obtained are summarized in the following Table 1.

In addition, a multi-layered bottle was prepared from the pellets according to the method described above and the oxygen-barrier properties thereof were evaluated and the Hunter's color b value was likewise determined. The results thus obtained are summarized in the following Table 2.

Comparative Example 1

The same procedures used in Example 1 were repeated except for omitting the incorporation, into the composition, the hydrogenated styrene-isoprene-styrene tri-block copolymer resin (HYBLER 7125 available from Kuraray Corporation) to thus form pellets of the resulting resin composition and to calculate the amount of oxygen absorbed by the resin composition (cc/g). The results thus obtained are summarized in the following Table 1.

In addition, a multi-layered bottle was prepared from the pellets according to the method described above and the oxygen-barrier properties thereof were evaluated and the Hunter's color b value was likewise determined. The results thus obtained are summarized in the following Table 2.

TABLE 1

| | Amt. of Absorbed Oxygen (cc/g) | | | |
|---|---|---|---|---|
| Ex. No. | After 3 Days | After 7 Days | After 14 Days | After 30 Days |
| 1 | 18.9 | 44.9 | 66.3 | 100.6 |
| 2 | 19.0 | 46.0 | 64.0 | 100.0 |
| 3 | 14.0 | 41.0 | 60.0 | 98.0 |
| 4 | 15.0 | 42.0 | 61.5 | 99.0 |
| 1* | 0.0 | 0.0 | 3.0 | 50.0 |

*Comparative Example

TABLE 2

| | Amt. of Absorbed Oxygen (cc/g) | | | | Hunter's Color b Value | |
|---|---|---|---|---|---|---|
| Ex. No. | Aft. 14 days | Aft. 30 days | Aft. 3 months | Aft. 6 months | Immediately Aft. Molding | Aft. 6 Months |
| 1 | 0.0 | 0.0 | 0.0 | 0.0 | 1.9 | 2.9 |
| 2 | 0.0 | 0.0 | 0.0 | 0.0 | 1.9 | 2.9 |
| 3 | 0.0 | 0.0 | 0.0 | 0.0 | 1.8 | 2.8 |
| 4 | 0.0 | 0.0 | 0.0 | 0.0 | 1.8 | 2.9 |
| 1* | 0.2 | 0.4 | 1.2 | 2.4 | 1.8 | 2.0 |

*Comparative Example

Evaluation 2

1. Structural Analysis of Oxygen-Absorbing Resin

A linear low-density polyethylene resin (0.2 g) was cooled for 10 minutes in a freeze-pulverizing machine (JFC-300 available from Nippon Analysis Industry Co., Ltd.) and then pulverized for 10 minutes. Then, to 0.06 g of the resulting pellets, there was added 0.6 ml of a 1:3 deutero benzene/o-dichlorobenzene mixed solvent followed by the heat sealing and the subsequent $^{13}$C-NMR measurement (EX-270 available from JEOL Ltd.) to thus evaluate the composition of the side chains of the resin.

2. Evaluation of Oxygen-Absorbing Properties

An oxygen-absorbing resin composition (0.1 g) comprising an oxygen-absorbing resin, an oxidation-trigger resin and a transition metal catalyst was sealed in a sealable container having an inner volume of 85 cc and then this was stored at 30° C. After the elapse of one month, the oxygen concentration in the container was determined by the gas chromatography technique (GC3BT: Shimadzu Corporation; detector: TCD (60° C.); column: molecular sieve 5A (100° C.); carrier gas: argon) to thus determine the amount of absorbed oxygen per unit gram (1 g) of the oxygen-absorbing resin composition. The evaluation criteria are as follows: x: the amount of absorbed oxygen is less than 10 cc/g; ○: the amount of absorbed oxygen is not less than 10 cc/g.

3. Evaluation of By-Products Formed Through Oxidation

The sealed container was stored at 30° C., which contained the oxygen-absorbing resin composition comprising the linear low-density polyethylene resin, the oxidation-trigger resin and the transition metal catalyst to thus make the linear low-density polyethylene resin absorb about 30 cc of oxygen per 1 g of the resin.

At this stage, 5 cc of the gas within the sealed container was collected using a syringe and it was inspected for the presence of by-products formed through the oxidation using GC-MS (TEKMAR-4000: available from agilent Company; column: DB-1) according to the purging and trapping method.

The area of the resulting gas chromatogram was defined to be the amount of the by-products formed through the oxidation and it was evaluated according to the following criteria: ○: the value of the area is less than $1\times10^7$; Δ: the value is not less than $1\times10^7$ and less than $2\times10^7$; and x: the value is not less than $2\times10^7$.

Example 5

There were incorporated 5% by mass of a hydrogenated styrene-butadiene-styrene copolymer resin (TUFTEC P2000 available from Asahi Kasei Chemicals Co., Ltd.) and a cobalt stearate having cobalt metal content of 9.55 by mass (available from Dainippon Ink and Chemicals, Inc.) in an amount of 150 ppm as expressed in terms of the amount of metal cobalt, into 95% by mass of a linear low-density polyethylene resin (EVOLUE 0510B: available from Mitsui Chemical Co., Ltd.) prepared by polymerizing ethylene and 1-hexene as starting monomers in the presence of a metallocene catalyst as a single-site catalyst and having side chains branched from the main chain, which consisted of 0.002 eq/g of groups derived from linear hydrocarbons, followed by pre-kneading of these components in a stirring-dryer (available from Dalton Co., Ltd.) and the subsequent introduction thereof (pre-mix) into a hopper.

Then the resulting pre-mix was extruded into a strand-like extrudate using a twin-screw extruder (TEM35B: Toshiba Machine Co., Ltd.) equipped with a strand die at the exit thereof at a rotational frequency of the screw of 100 rpm while ventilating to a high vacuum to thus prepare pellets of the oxygen-absorbing resin composition.

The resulting material was inspected for the amount of by-products formed through the oxidation according to the foregoing evaluation method and likewise the mechanical strength thereof and as a result, it was found that the material showed good oxygen-absorbing properties and by-products were formed only in a small amount.

Example 6

The same procedures used in Example 1 were repeated except for using a linear low-density polyethylene resin (ZM063: available from Ube Industries, Ltd.) having side chains branched from the main chain, which consisted of 0.0011 eq/g of groups derived from linear hydrocarbons to thus prepare an oxygen-absorbing resin composition and to carry out the evaluation of the resin composition. This material likewise showed good oxygen-absorbing properties and by-products were formed only in a small amount.

Example 7

The same procedures used in Example 1 were repeated except for using a usual high pressure-processed low-density polyethylene resin (JB221R available from Nippon Polyethylene Co., Ltd.) which was never referred to as the linear low-density polyethylene resin instead of the resin used in Example 1 to thus prepare an oxygen-absorbing resin composition and to carry out the evaluation of the resin composition. The resin was found to have 0.0011 eq/g of chain-like side chains carrying branches having various chain lengths. The amounts of by-products observed in Examples 5 and 6 were smaller than that observed in Example 7 because of the difference in shapes of the chain-like side chains.

The results obtained in Examples 5 to 7 are summarized in the following Table 3

TABLE 3

| | | Ex. No. | | |
|---|---|---|---|---|
| | | 5 | 6 | 7 |
| Catalyst | | Single-site catalyst (metallocene) | Single-site catalyst (metallocene) | Radical Initiator |
| Kind of Resin | | LLDPE | LLDPE | LDPE |
| Structural Analysis of Resin | | | | |
| No. of branches (eq/g) | | 0.002 | 0.0011 | 0.0011 |
| Rate of Side Chains (%) | C1 | 0 | 0 | 0 |
| | C2 | 0 | 0 | 0 |
| | C4 | 100 | 100 | 60 |
| | C5 | 0 | 0 | 10 |
| | C6≦ | 0 | 0 | 30 |
| Presence of Branch | | None | None | Present |
| Evaluation | | | | |
| Oxygen-absorbing properties | | ○ | ○ | ○ |
| Amt. of by-product formed through oxidation | | ○ | ○ | X |

Evaluation 3

1. Structural Analysis of Base Resin

A low-density polyethylene resin (0.2 g) was cooled for 10 minutes in a freeze-pulverizing machine (JFC-300 available from Nippon Analysis Industry Co., Ltd.) and then pulverized for 10 minutes. Then, to 0.06 g of the resulting pellets, there was added 0.6 ml of a 1:3 deutero benzene/o-dichlorobenzene mixed solvent followed by the heat sealing and the subsequent $^{13}$C-NMR measurement (EX-270 available from JEOL Ltd.). There were then determined the number of branches included in the main chain of the low-density polyethylene resin and the number of carbon atoms of the side chains on the basis of the results obtained in the foregoing measurement. The results were evaluated on the basis of the following criteria: ○: The base resin comprises side chains consisting of 0.003 eq/g or less of linear hydrocarbons; x: Other base resins.

2. Evaluation of Oxygen-Absorbing Properties

An oxygen-absorbing resin composition was cooled for 10 minutes in a freeze-pulverizing machine (JFC-300 available from Nippon Analysis Industry Co., Ltd.) and then pulverized for 10 minutes. Then, there were introduced, into a sealable container having an inner volume of 85 cc, 0.1 g of the resulting sample and 1 cc of distilled water and then the container was sealed with a capping material comprising an aluminum foil as a barrier layer. After storing the sealed container at 30° C. for 2 weeks, the oxygen concentration in the container was determined by the gas chromatography technique (GC-3BT available from Shimadzu Corporation). The evaluation criteria are as follows: ○: the amount of absorbed oxygen is not less than 5 cc per 1 g of the sample; x: the amount of absorbed oxygen is less than 5 cc per 1 g of the sample.

3. Evaluation of By-Products Formed Through Oxidation

The sealed container was stored at 30° C., which comprised the oxygen-absorbing resin composition used above in the evaluation of the oxygen-absorbing properties to thus make the oxygen-absorbing resin composition absorb about 50 cc of oxygen per 1 g of the resin composition. At this stage, 5 cc of the gas within the sealed container was collected using a syringe and it was inspected for the presence of by-products formed through the oxidation using GC-MS (TEKMAR-4000: available from agilent Company; column: DB-1) according to the purging and trapping method. The area of the resulting gas chromatogram was defined to be the amount of the by-products formed through the oxidation and it was evaluated according to the following criteria: ○: the value of the area is less than $2.5 \times 10^7$; and x: the value is not less than $2.5 \times 10^7$.

4. Evaluation of Mechanical Strength

The pellets of each oxygen-absorbing resin composition were sandwiched between heating plates and then heated to a temperature of 200° C. to thus form a sheet having a thickness of 0.3 mm. A dumbbell-shaped specimen was cut out from the resulting sheet. This specimen was stored in the foregoing sealable container having an inner volume of 85 ml at 30° C. to thus make the specimen absorb 15 cc/g of oxygen. This specimen was then used in the tensile test (stress rate: 500 mm/min) carried out within an environment of 23° C.-50% RH using a tensile tester (TENSILON UCT-5T available from T. S Engineering Co., Ltd.) to thus determine the elongation at breakage. The resulting elongation at breakage was divided by the elongation at breakage (initial elongation at breakage) observed for the specimen prior to the oxygen-absorption and each specimen was evaluated on the basis of the following criteria: ○: The specimen has an elongation at breakage of not less than 50% of the initial elongation at breakage; and x: The specimen has an elongation at breakage of less than 50% of the initial elongation at breakage.

Example 8

The same procedures used in Example 5 were repeated except for using a linear low-density polyethylene resin LLDPE (ZM063 available from Ube Industries, Ltd.) prepared using a metallocene catalyst to prepare an oxygen-absorbing resin composition and to evaluate the same. The oxygen-absorbing resin composition thus prepared showed good oxygen-absorbing properties, by-products were formed only in a small amount and the mechanical strength was found to be only slightly reduced.

Example 9

The same procedures used in Example 5 were repeated except for using a usual high pressure-processed low-density polyethylene resin (JB221R available from Nippon Polyethylene Co., Ltd.) which was never referred to as the linear low-density polyethylene resin instead of the base resin used in Example 5 to thus prepare an oxygen-absorbing resin composition and to carry out the evaluation of the resin composition. The oxygen-absorbing resin composition thus prepared was found to have excellent oxygen-absorbing properties, but a large amount of by-products was formed through oxidation since the resin included complicated long chain branches and the mechanical strength was also greatly reduced.

Example 10

The same procedures used in Example 5 were repeated except for using a linear low-density polyethylene resin (ULTZEX 2020SB available from Mitsui Chemical Co., Ltd.) prepared using a multi-site catalyst instead of the base resin used in Example 5 to thus prepare an oxygen-absorbing resin composition and to carry out the evaluation of the resin composition. The oxygen-absorbing resin composition thus prepared was found to have excellent oxygen-absorbing properties, but a large amount of by-products, in particular, acetone was formed through oxidation since the resin included side chains having branches derived from 4-methylpentene-1. The mechanical strength of the oxygen-absorbing resin composition was not determined.

Example 11

The same procedures used in Example 5 were repeated except for using an ethylene-propylene random copolymer resin (RE 386 available from Nippon Polypro Co., Ltd.) prepared using a multi-site catalyst instead of the base resin used in Example 5 to thus prepare an oxygen-absorbing resin composition and to carry out the evaluation of the resin composition. The oxygen-absorbing resin composition thus prepared was found to have good oxygen-absorbing properties, but a very large amount of by-products was formed through oxidation since the resin was highly branched and the mechanical strength of the oxygen-absorbing resin composition was found to be greatly reduced.

The following Table 4 shows the results obtained in Examples 5 and 8 to 11. The data listed in Table 4 clearly indicate that there are observed distinct differences in the oxygen-absorbing properties, the amount of by-products formed through oxidation and the degree of reduction in the mechanical strength due to the difference in the branched condition between the resins used.

TABLE 4

| | | Ex. No. | | | | |
|---|---|---|---|---|---|---|
| | | 5 | 8 | 9 | 10 | 11 |
| Base Resin | | LLDPE | LLDPE | LDPE | LLDPE | PP |
| Catalyst | | Cat-1[1] | Cat-1 | Cat-2[2] | Cat-3[3] | Cat-3 |
| Structural Analysis of Resin | | | | | | |
| No. Of Side Chains (eq/g) | | 0.002 | 0.001 | 0.001 | | 0.025 |
| Rate of Side Chains (%) | C1 | 0 | 0 | 0 | 0 | 80 |
| | C2 | 0 | 0 | 0 | 33 | 0 |
| | C4 | 100 | 100 | 60 | 30 (linear) | 10 |
| | C5 | 0 | 0 | 13 | 37 (isobutyl) | 5 |
| | C6≦ | 0 | 0 | 27 | | 5 |
| Adaptability of side chains to the present invention | | ○ | ○ | X | X | X |
| Evaluation of Oxygen-absorbing Material | | | | | | |
| Oxygen Absorption | | ○ | ○ | ○ | ○ | ○ |
| By-products formed through oxidation | | ○ | ○ | Δ | X | X |
| Ability of maintaining mechanical strength | | ○ | ○ | X | Not confirmed | X |

[1]Cat-1: A metallocene type single-site catalyst;
[2]Cat-2: A radical initiator;
[3]Cat-3: A multi-site catalyst.

What is claimed is:

1. An oxygen-absorbing resin composition comprising (A) a hydrogenated styrene-diene copolymer comprising carbon-carbon double bonds derived from the diene in the amount of $1 \times 10^{-5}$ to $1 \times 10^{-2}$ eq/g; (B) a thermoplastic resin including ethylenic structural units in its molecular structure; and (C) a transition metal catalyst, wherein the resin (B) is a polyethylene resin, the content of which in the resin composition ranges from 90 to 99% by mass and the oxidation of the thermoplastic resin (B) proceeds while the copolymer (A) serves as a trigger and the composition thus absorbs oxygen; and wherein the resin (B) is a linear low-density polyethylene resin whose side chain consists of linear hydrocarbons in the amount of not more than 0.003 eq/g; and wherein resin (B) is free of added ethylene-vinyl alcohol copolymer (EVOH).

2. The oxygen-absorbing resin composition of claim 1, wherein the diene is butadiene.

3. The oxygen-absorbing resin composition of claim 1, wherein the diene is isoprene.

4. The oxygen-absorbing resin composition of claim-1, wherein the copolymer (A) is a hydrogenated styrene-diene-styrene tri-block copolymer.

5. The oxygen-absorbing resin composition of claim 4, wherein the hydrogenated styrene-diene-styrene tri-block copolymer is a hydrogenated styrene-isoprene-styrene tri-block copolymer or a hydrogenated styrene-butadiene-styrene tri-block copolymer.

6. The oxygen-absorbing resin composition of claim 1, wherein the resin (B) is one prepared by the polymerization using a single-site catalyst.

7. The oxygen-absorbing resin composition of claim 1, wherein the copolymer (A) is dispersed in a matrix of the resin (B).

8. The oxygen-absorbing resin composition of claim 1, further comprising a phosphorus atom-containing antioxidant in the amount of not more than 2000 ppm.

9. An oxygen-absorbing resin composition comprising (A) a hydrogenated styrene-diene copolymer comprising carbon-carbon double bonds derived from the diene in the amount of $1 \times 10^{-5}$ to $1 \times 10^{-2}$ eq/g; (B) a thermoplastic resin including ethylenic structural units in its molecular structure; and (C) a transition metal catalyst, wherein the resin (B) is a polyethylene resin, the content of which in the resin composition ranges from 90 to 99% by mass and the oxidation of the thermoplastic resin (B) proceeds while the copolymer (A) serves as a trigger and the composition thus absorbs oxygen; and wherein the resin (B) consists essentially of an oxygen absorbing linear low-density polyethylene resin whose side chain consists of linear hydrocarbons in the amount of not more than 0.003 eq/g.

* * * * *